United States Patent
Marks et al.

(10) Patent No.: US 7,552,291 B2
(45) Date of Patent: Jun. 23, 2009

(54) SYSTEM AND METHOD FOR SUBDIVIDING A STORAGE ENCLOSURE INTO SEPARATE STORAGE DOMAINS

(75) Inventors: Kevin T. Marks, Round Rock, TX (US); John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 10/753,511

(22) Filed: Jan. 8, 2004

(65) Prior Publication Data
US 2005/0154826 A1 Jul. 14, 2005

(51) Int. Cl.
*G06F 12/02* (2006.01)
(52) U.S. Cl. ................ 711/153; 711/114; 711/173
(58) Field of Classification Search ........ None
See application file for complete search history.

(56) References Cited

U.S. PATENT DOCUMENTS

| | | | | |
|---|---|---|---|---|
| 6,633,962 | B1 * | 10/2003 | Burton et al. | 711/163 |
| 2001/0016904 | A1 * | 8/2001 | Hall | 713/1 |
| 2004/0024962 | A1 * | 2/2004 | Chatterjee et al. | 711/114 |

* cited by examiner

*Primary Examiner*—Gary J Portka
(74) *Attorney, Agent, or Firm*—Baker Botts L.L.P.

(57) ABSTRACT

The storage enclosure includes a number of storage drives, each of which is physically coupled to each of two controllers in the storage enclosure. A memory location associated with the storage enclosure includes a value. The value provides an indicator for grouping the storage drives with one of the two controllers and disabling communications between each storage controller and the storage drives not associated with the controller.

10 Claims, 2 Drawing Sheets

SYSTEM AND METHOD FOR SUBDIVIDING A STORAGE ENCLOSURE INTO SEPARATE STORAGE DOMAINS

TECHNICAL FIELD

The present disclosure relates generally to the field of computer networks, and, more particularly, to a Serial Attached SCSI storage network.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be included as elements of a storage network. A storage network can be considered as a specialized network of storage devices coupled to one or more data servers. A storage enclosure is an element of a storage network. A storage enclosure is a self-contained physical enclosure that includes within the enclosure a number of storage elements or storage drives. Storage drives typically comprise disk-based hard drives. Today, many parallel SCSI storage enclosures have the ability to be split to create two separate SCSI buses, allowing two SCSI storage networks to share the same storage enclosure. In this configuration, each of the SCSI storage networks will include its own dedicated SCSI bus and generally half of the slots or storage drives of the storage enclosure. A configuration of this kind is possible in a parallel SCSI network because the SCSI bus within the storage enclosure can be physically or electrically split, thereby forming two separate SCSI domains. The SCSI bus of the parallel SCSI network of the storage enclosure can be divided by placing a mechanical disconnection in the storage enclosure or by electrically isolating the two SCSI buses by disabling the repeater or expanders along the length of the SCSI bus. The dividing of the SCSI bus creates separate SCSI domains.

Serial Attached SCSI (SAS) is a storage network interface and communications protocol for storage transactions. Serial Attached SCSI is characterized by storage networks having a serial, point-to-point architecture and improved data integrity, as compared with parallel SCSI storage networks. Because of the topology of an SAS storage network, separate SCSI domains cannot be created by dividing the SCSI bus of the storage enclosure, as buses are not present in an SAS architecture. Each storage drive of an SAS storage network is dual ported, and each storage drive can be coupled to two controllers of the enclosure. Because each drive can be coupled to each of the two controllers of the enclosure, each drive may be accessed through each of the two host ports coupled to the storage enclosure through the controllers of the storage enclosure.

SUMMARY

In accordance with the present disclosure, a system and method for subdividing a storage enclosure is disclosed. The storage enclosure includes a number of storage drives, each of which is physically coupled to each of two controllers in the storage enclosure. A memory location associated with the storage enclosure includes a value. The value provides an indicator for grouping the storage drives with one of the two controllers and disabling communications between each storage controller and the storage drives not associated with the controller. Following the disablement of communications between each storage controller and selected storage drives, each storage drive is physically isolated into a storage domain associated with one of the two controllers.

The system and method disclosed herein is advantageous in that it presents a topology for a storage enclosure that permits the storage enclosure to migrate from a clustered storage environment to an isolated storage environment. The value that governs the allocation of storage drives among the domains can also be set to a predefined value, in which case each storage drive is connected to each of the two controllers of the storage enclosure. By setting the value to either a value of zero or a numerical value, the storage drives of the storage enclosure can be configured in a clustered environment, as in the case of a zero value, or in the domain-isolated environment, in the case of a numerical value. The method for isolating storage drives into domains is also advantageous in that it permits multiple Serial Attached SCSI domains to be established on a single storage enclosure in which all of the storage drives would otherwise be logically coupled with each SAS input port in a clustered environment. The system disclosed herein is also advantageous in that it allows the techniques of physically or electrically isolating storage drives to be employed in an SAS storage network. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
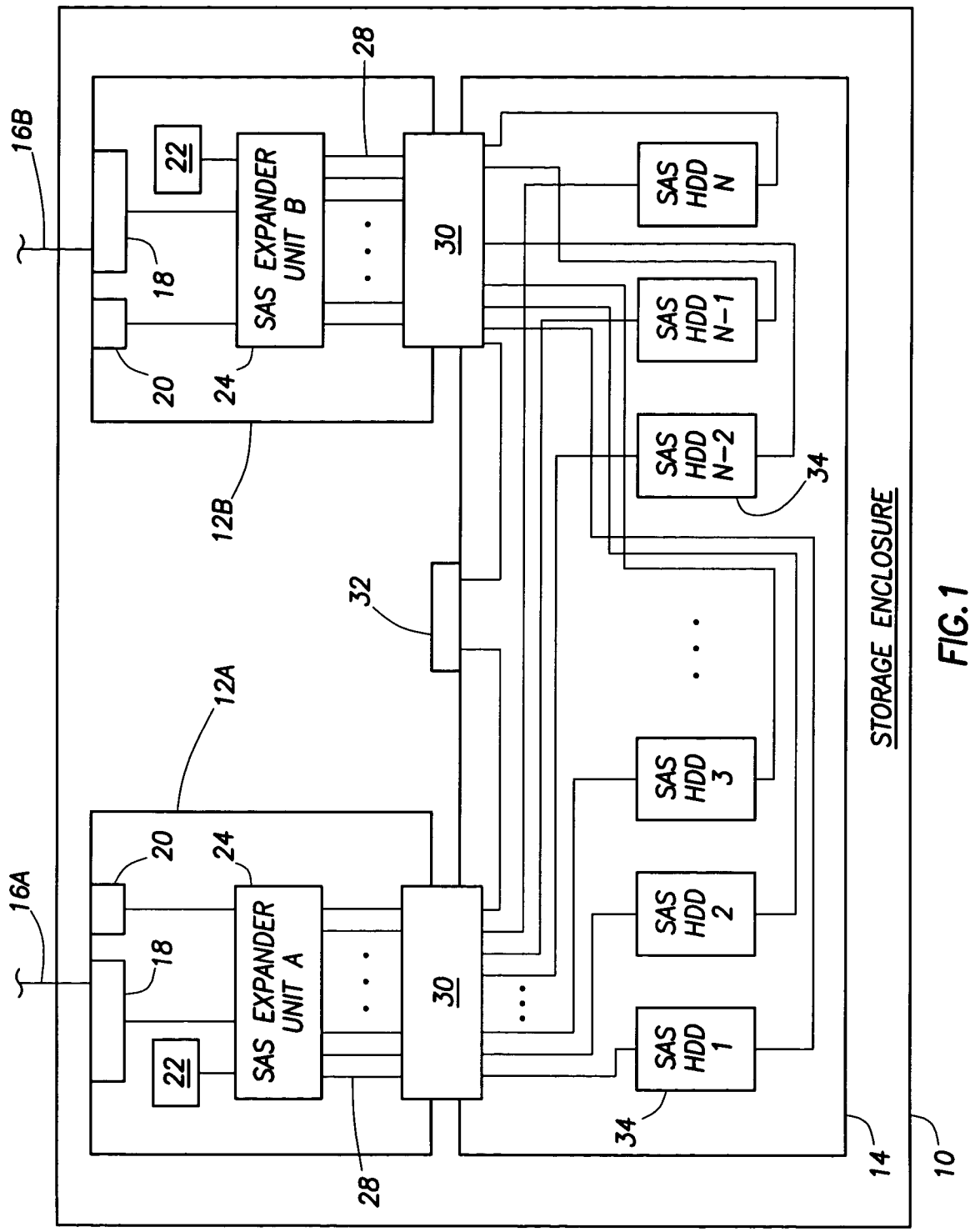
FIG. 1 is a block diagram of a storage enclosure.

Shown in FIG. 1 is a block diagram of a storage enclosure, which is indicated at 10. Storage enclosure 10 includes a pair of controllers 12A and 12B. Controller 12A is coupled to SAS host connection 16A, and controller 12B is coupled to SAS host connection 16B. Each of the SAS host connections 16A and 16B of the controllers 12 is coupled to an SAS host port 18. Each of the controllers 12 also includes an SAS expander unit or expander block 24. The SAS expanders units of FIG. 1 are identified specifically as SAS expander unit A and SAS expander unit B. Coupled to each SAS expander unit 24 is an input programming unit 20 and an enclosure management unit 22. The SAS storage drives 34 of the storage enclosures are mounted within a backplane 14. Backplane 14 is coupled to each of the controllers 12 through connector devices 30. Connector device 30 is a high speed connectors that serves an interface between the backplane and the controllers. SAS expander units 24 convert single 4×wide port communication link from SAS host port 18 into a number of point-to-point SAS connections 28, which are coupled to each of the SAS storage drives 34 through connector devices 30. As shown in FIG. 1, each of the SAS storage drives 34 are coupled to both SAS expander unit A and SAS expander unit B. Enclosure 10 includes a non-volatile memory device 32, which can be programmed through one or the other of the input programming units 20.

The Serial Attached SCSI storage network interface includes a layering of protocols. Included within the layering of protocols is the Phy layer. A Phy is defined as transmitter-receiver (transceiver) pair within the SAS storage network. Two SAS domains are defined in the storage enclosure of FIG. 1. A first domain is associated with controller 12A, SAS host connection 16A, and SAS expander unit A, and a second domain is associated with controller 12B, SAS host connection 16B, and SAS expander unit B. Within the SAS storage network interface environment, a Phy of an expander can be disabled though a PHY CONTROL command issued through the Serial Management Protocol (SMP). Using this command, a Phy of an expander can be disabled through a client application or through the local programming of the storage enclosure. An expander unit is thus able to permanently disable a Phy that would otherwise be coupled to and communicative with the expander unit. In this manner, once the Phy is disable, a client application cannot detect the presence of the Phy and the client application cannot issue a command to reenable the Phy. Once a Phy is disable according to this procedure, the Phy is not detectable by a client application through standard SMP commands and cannot be reenabled until the next power cycle.

Figure 2:
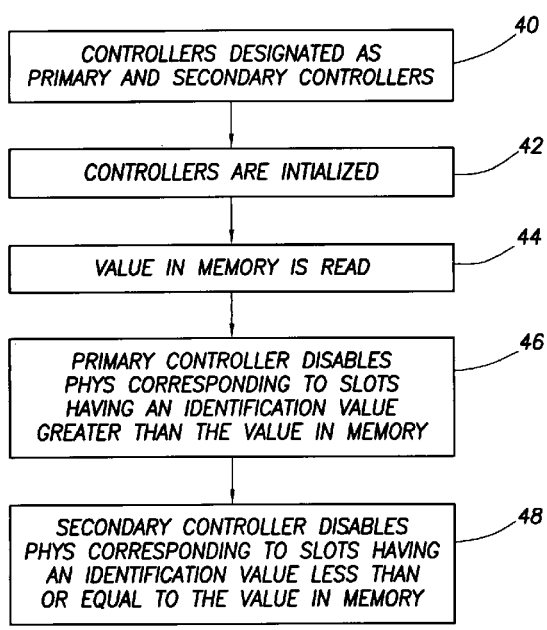
FIG. 2 is a flow diagram of the method steps for programming the controller of a storage enclosure.

In operation, one of the two controllers is designated as the master or primary controller, and the other controller is designated as the slave or secondary controller. The designation of the controller as the primary or secondary controllers may be accomplished, for example, through the setting of input pins in the controller slot of the storage enclosure. Alternatively, the designations of the controller as primary and secondary controllers could be accomplished through input programming unit 20. A flow diagram of the method steps for programming the controllers and associating each controller with the storage drives of the storage enclosure is shown in FIG. 2. The storage drives typically comprise disk-based hard drives. At step 40 of FIG. 2, each of the controllers of the storage enclosure is programmed such that one of the controllers is programmed as the primary controller and the other controller is programmed as the secondary controller. For the sake of the examples in this disclosure, the primary controller will be controller 12A, and the secondary controller will be controller 12B, although it should be recognized that the designations could be reversed. At step 42, the controllers are initialized following the designations of the controllers as the primary and secondary controllers. At step 44, each expander unit reads the value stored in shared non-volatile memory 32. The value in memory 32 may be set through input programming unit 20 or through a host-based or client-based software utility.

The value stored in memory 32 identifies for each of the expander units those storage drives that will be in communication with the expander units and will therefore reside in the SAS domain of the associated controller; and, conversely, the storage drives that will not be in communication with the expander and will therefore not reside in the SAS domain of the associated controller. Each storage drive is typically housed or coupled to a storage drive slot. The storage drives slots of storage enclosure 10 are numbered consecutively, beginning at 1. In the example of FIG. 1, there are eight SAS storage drives, numbered from 1 to N to represent the number of the storage drive slot associated with the storage drive. With respect to the primary controller, the value in memory 32 is the number of drives that will reside in its SAS domain. The primary controller will communicate with all storage drives having a slot identification number equal to or lower than the value in memory 32. At step 46, the primary controller will disable those Phys between its expander device and those storage drives having an identification number greater than the value in memory 32.

With respect to the secondary controller, the value in memory 32 is the number of drives that will not reside in its SAS domain. The secondary controller will communicate with all storage drives having a slot identification number greater than the value in memory 32. At step 48, the secondary controller will disable those Phys between its expander unit and those storage drives having a slot identification number less than or equal to the value in memory 32. The value stored in memory 32 serves as a dividing line for logically separating the storage drives of the enclosure into separate SAS domains. Once a Phy is disabled, the Phy remains disabled until the controller is next initialized. If memory 32 contains a designated null value (such as a 0h), each of the controllers communicates with all of the storage drives of the storage enclosure, thereby establishing a clustering environment in the storage enclosure. In the absence of a null value in memory 32, the enclosure in split or subdivided mode, and the storage drives of the enclosure are separated into SAS domains according to the format set out above.

The following example will assume that a value of 4 is programmed into the memory 32 and that a total of eight storage drives are included in the storage enclosure. At startup of the controllers, the controllers will determine which of the two controllers has been designated as the primary controller and which controller has been designated as the secondary controller. The primary controller will disable those Phys between the expander device of the primary controller and those storage drives having a slot identification number greater than 4 (drives 5, 6, 7, and 8). The secondary controller will disable those Phys between the expander device of the secondary controller and those storage drives having a slot identification number less than or equal to 4 (drives 1, 2, 3, and 4). In this example, the expander of the primary controller communicates only with drives 1, 2, 3, and 4; and the expander of the secondary controller communicates only with drives 5, 6, 7, and 8. The value stored in memory 32 could be displayed on the storage enclosure controller as an aid in programming or diagnosing the operation of the drives of the storage enclosure while in split or divided mode.

Figure 3:
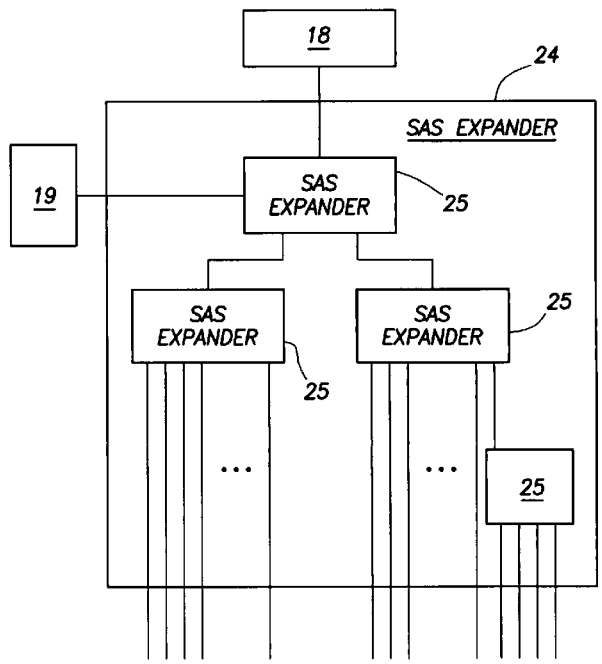
FIG. 3 is a block diagram of an expander device.

FIG. 3 is an alternate embodiment of the expander unit 24, which is shown in FIG. 1. The SAS expander unit 24 of FIG. 3 includes connections to host port 18 and host port 19. SAS expander unit 24 includes four SAS sub-expander units 25, which further expand the SCSI connections until the desired number of individual SCSI connections are reached for the sake of the point-to-point SAS storage network.

The storage enclosure topology and the method for subdividing a storage enclosure disclosed herein provides a technique for moving between a cluster or point-to-point based storage network topology or an alternate topology in which a single storage enclosure can be separated into separate SAS domains. A user can alternate between the two topologies with little difficulty, as the transition from one topology to another involves resetting a value in the memory of the storage enclosure and resetting or initializing the storage enclosure. Although the present disclosure has been described in detail, it should be understood that various changes, substitutions, and alterations can be made hereto without departing from the spirit and the scope of the invention as defined by the appended claims.

What is claimed is:

1. A method for subdividing a storage enclosure into separate storage domains, said method comprising the steps of:
providing a storage enclosure having a plurality of storage drives, primary and secondary controllers coupled to the plurality of storage drives, and a storage drive domain definition memory coupled to the primary and secondary controllers, wherein each one of the plurality of storage drives has a unique identification number that is sequentially numbered with the other unique identification numbers of the other ones of the plurality of storage drives, wherein the primary controller is associated with a first domain and the secondary controller is associated with a second domain;
storing a one or a certain one of a plurality of integer numbers in the storage drive domain definition memory, wherein the one of the plurality of integer numbers defines which ones of the plurality of storage drives communicate with the primary controller and which other ones of the plurality of storage drives communicate with the secondary controller, and
wherein the certain one of the plurality of integer numbers defines that all of the plurality of storage drives communicate with both the primary and secondary controllers; and
reading the storage drive domain definition memory by the primary and secondary controllers to determine which ones of the plurality of storage drives communicate with the primary controller and which other ones of the plurality of storage drives communicate with the secondary controller when the one of the plurality of integer numbers is read, or whether all of the plurality of storage drives communicate with both the primary and secondary controllers when the certain one of the plurality of integer numbers is read.

2. The method according to claim 1,
wherein the one of a plurality of integer numbers is an integer number between 1 and the number of storage drives in the storage enclosure;
wherein each one of the plurality of storage drives is uniquely associated with a number between 1 and the number of storage drives in the enclosure;
wherein the primary controller communicates with those ones of the plurality of storage drives having the unique identification numbers that are less than or equal to the one of the plurality of integer numbers; and
wherein the secondary controller communicates with those other ones of the plurality of storage drives having the unique identification numbers that are greater than the one of the plurality of integer numbers.

3. The method according to claim 2, wherein each one of the plurality of the storage drives is physically coupled to the primary and secondary controllers according to a point-to-point topology.

4. The method according to claim 3, wherein communications in the storage enclosure occur according to the Serial Attached SCSI protocol.

5. The method according to claim 1, wherein the step of reading the one or the certain one of the plurality of integer numbers in the storage drive domain definition memory by the primary and secondary controllers occurs following initialization of the primary and secondary controllers of the storage enclosure.

6. The method according to claim 5, wherein the certain one of the plurality of integer numbers is a null value.

7. A storage enclosure in a storage network, comprising:
a storage enclosure;
a plurality of storage drives contained in the storage enclosure;
first and second controllers coupled to the plurality of storage drives; and
a storage drive domain definition memory coupled to the primary and secondary controllers,
wherein each one of the plurality of storage drives has a unique identification number that is sequentially numbered with the other unique identification numbers of the other ones of the plurality of storage drives,
wherein the first controller is associated with a first domain and the second controller is associated with a second domain;
wherein a one of a plurality of integer values is stored in the storage drive domain definition memory,
whereby the one of the plurality of integer values defines which ones of the plurality of storage drives communicate with the first controller and which other ones of the plurality of storage drives communicate with the second controller, and
wherein a certain one of the plurality of integer values defines that all of the plurality of storage drives communicate with both the first and second controllers.

8. The storage enclosure according to claim 7, wherein the certain one of the plurality of integer values is zero.

9. The storage enclosure according to claim 7,
wherein the one of the plurality of integer values is an integer number between 1 and the number of storage drives in the storage enclosure;
wherein each one of the plurality of the storage drives is uniquely associated with a number between 1 and the number of storage drives in the storage enclosure;

wherein the first controller communicates with the ones of the plurality of storage drives associated with a number less than or equal to the one of the plurality of integer values; and wherein the second controller communicates with the other ones of the plurality of storage drives associated with a number greater than the one of a plurality of integer values.

10. The storage enclosure according to claim 7, wherein the storage drive domain definition memory is a programmable read-only memory that is located within the storage enclosure and programmable through an interface to the storage enclosure.

* * * * *